(No Model.)

R. B. HAIN.
CARBURETOR.

No. 546,815. Patented Sept. 24, 1895.

Witnesses
Lewis E. Flanders
Lois Moulton

Inventor
Ralph B. Hain
By Attorney
Luther V. Moulton

UNITED STATES PATENT OFFICE.

RALPH B. HAIN, OF GRAND RAPIDS, MICHIGAN.

CARBURETOR.

SPECIFICATION forming part of Letters Patent No. 546,815, dated September 24, 1895.

Application filed January 14, 1895. Serial No. 534,791. (No model.)

*To all whom it may concern:*

Be it known that I, RALPH B. HAIN, a citizen of the United States, residing at Grand Rapids, in the county of Kent and State of Michigan, have invented certain new and useful Improvements in Carburetors; and I do hereby declare the following to be a full, clear, and exact description of the invention, such as will enable others skilled in the art to which it appertains to make and use the same.

My invention relates to improvements in carburetors, and its object is to provide the same with certain new and useful features hereinafter more fully described, and particularly pointed out in the claims, reference being had to the accompanying drawings, in which—

Figure 1:
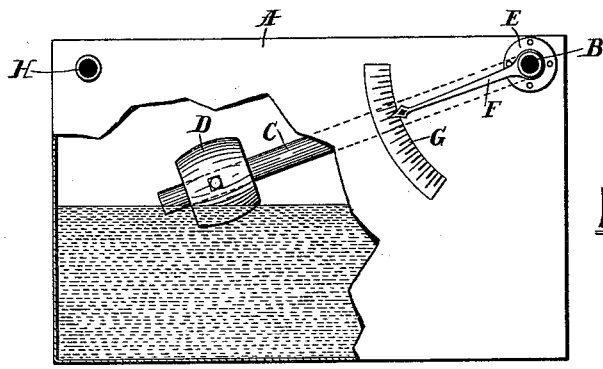
Figure 2:
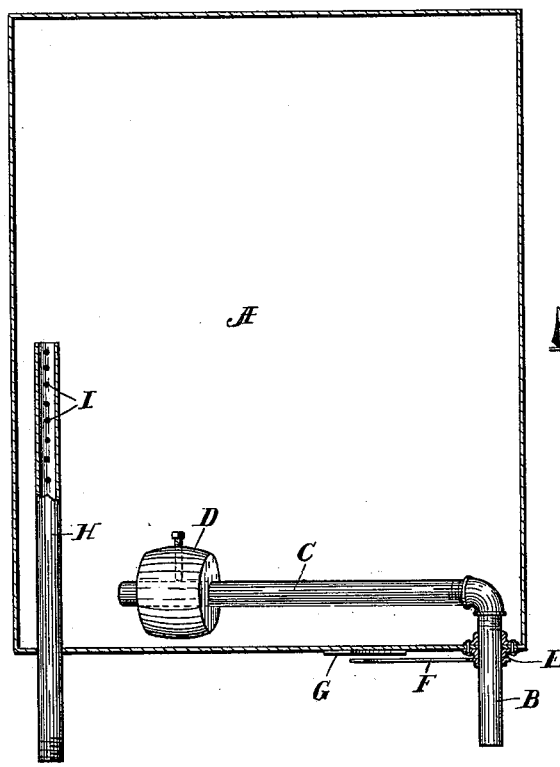

Figure 1 is an end elevation of a device embodying my invention with a portion of the end wall broken away, and Fig. 2 a plan view of the same with the top plate removed.

Like letters refer to like parts in both of the figures.

A represents any convenient closed vessel or tank to contain the gasoline or other volatile liquid.

B is a horizontal inlet-pipe inserted in the wall of said vessel A, near the upper part of the same, and passing through a suitable gland E and rotative therein.

C is an extension of the pipe B, at right angles to the same and within the vessel A. The inner end of the extension C tends to turn about the axis of the pipe B and rest upon the bottom of the vessel A.

D is a float, of cork or other suitable material, adjustably attached to said extension C, which supports the same and floats upon the liquid contents of the said vessel A.

F is an index fixed on the pipe B and turning with said pipe about its axis. Beneath the movable end of said index is a scale G, upon which is indicated the amount of liquid in the vessel or angle of the pipe C by the position of said index on said scale.

H is a fixed horizontal eduction-pipe inserted in the upper part of the vessel A and provided with a series of openings I in its lower side for the escape of any liquid that may be condensed in said pipe or otherwise get into the same. When the tank is filled with fresh liquid, said liquid is in its most volatile state, and the float D by being adjusted near the movable end of the pipe extension C will raise said end above said liquid, and thus admit the air above the surface thereof. As the liquid decreases in amount, the float is lowered and the angle of the pipe extension C becomes such that its inner end is gradually and increasingly immersed beneath the surface of the liquid, the air thus passing through the liquid a gradually-increasing distance as said liquid lowers. By adjusting the float D on the pipe C the amount of immersion of the end of said pipe at given stages of the liquid may also be adjusted. I am thus able to equalize and regulate the amount of vapor taken up by the air to a practically uniform and proper proportion to get the best results, which amount of vapor otherwise tends to fall with the increasing density of the liquid due to evaporation and also to vary with the condition of the admitted air.

What I claim is—

1. In a carburetor, an inlet pipe having its upper end near the top of said vessel and extending outside the same and its inner end, vertically movable, and increasingly immersed in the liquid as it descends, and a float supporting the movable end of said pipe substantially as described.

2. In a carburetor, in combination, a closed vessel, a pipe within said vessel, and extending outside the same, and pivoted at its upper end, and having its lower end movable vertically in the arc of a circle, and gradually and increasingly immersed in the contents of the vessel as it descends, and a float on said pipe supporting its movable end, substantially as described.

3. In a carburetor, in combination with a closed vessel, a pipe inserted in the wall of said vessel and rotative therein, an extension of said pipe at right angles to the same and within the said vessel, and an adjustable float on said extension, substantially as described.

In testimony whereof I affix my signature in presence of two witnesses.

RALPH B. HAIN.

Witnesses:
LUTHER V. MOULTON,
LEWIS E. FLANDERS.